US008157705B2

United States Patent
Yu et al.

(10) Patent No.: US 8,157,705 B2
(45) Date of Patent: Apr. 17, 2012

(54) BRAKE ASSISTED CONTROL OF AN ENGINE RESTART EVENT

(75) Inventors: Hai Yu, Canton, MI (US); Mathew A. Boesch, Plymouth, MI (US); Ryan A. McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 471 days.

(21) Appl. No.: 12/565,933

(22) Filed: Sep. 24, 2009

(65) Prior Publication Data

US 2011/0071001 A1 Mar. 24, 2011

(51) Int. Cl.
*B60W 10/06* (2006.01)
*B60W 10/08* (2006.01)
*B60W 10/00* (2006.01)
*B60W 10/04* (2006.01)

(52) U.S. Cl. ........... 477/200; 477/4; 477/95; 477/183; 477/901

(58) Field of Classification Search .......... 477/4, 93, 477/94, 95, 183, 184, 186, 199, 200, 203, 477/901
See application file for complete search history.

(56) References Cited

U.S. PATENT DOCUMENTS

| 8,090,499 | B2* | 1/2012 | Tamai | 701/38 |
|---|---|---|---|---|
| 2002/0086772 | A1* | 7/2002 | Abe et al. | 477/102 |
| 2005/0143877 | A1* | 6/2005 | Cikanek et al. | 701/22 |
| 2006/0079377 | A1* | 4/2006 | Steen et al. | 477/186 |
| 2007/0054773 | A1* | 3/2007 | Braun et al. | 477/4 |
| 2011/0065548 | A1* | 3/2011 | Yu et al. | 477/203 |
| 2011/0136625 | A1* | 6/2011 | Yu et al. | 477/185 |

* cited by examiner

*Primary Examiner* — Roger Pang
(74) *Attorney, Agent, or Firm* — David B. Kelley, Esq.; MacMillan, Sobanski & Todd, LLC

(57) ABSTRACT

A method for restarting an engine of a vehicle includes engaging a gear of a transmission that driveably connects the engine and wheels of the vehicle; maintaining a current brake pressure greater than a reference brake pressure; initiating an automatic engine restart; using a timer to count down during a period of predetermined length; using a pump to produce a desired magnitude of brake pressure sufficient to suppress a wheel torque surge produced by restarting the engine and to hold the vehicle stationary; and releasing the brake pressure if either the timer expires or a peak in engine speed occurs.

20 Claims, 9 Drawing Sheets

BRAKE ASSISTED CONTROL OF AN ENGINE RESTART EVENT

BACKGROUND OF THE INVENTION

1. Field of the Invention

This invention relates generally to a vehicle powertrain applicable to a hybrid electric vehicle (HEV). More particularly, the invention pertains to active use of wheel brakes in the control of an engine restart.

2. Description of the Prior Art

A HEV is a vehicle that combines a conventional propulsion system, which includes an internal combustion engine and a step-change automatic transmission, a rechargeable energy storage system that includes an electric motor and electric storage battery to improve fuel economy over a conventional vehicle.

Motor vehicles can be designed to employ certain aspects of hybrid electric technology, but without use of a hybrid electric powertrain. Certain vehicles having a conventional powertrain but no electric machine for driving the wheels, called micro-HEVs, shutdown the engine at idle speed to reduce fuel consumption and reduce emissions while the vehicle is stopped.

During normal vehicle operation many instances arise where the vehicle must stop: at traffic signals, cross-walks, stop signs and the like. In micro-HEVs, the engine is shut down if no power is required, e.g. while waiting at a traffic light. As soon as power is requested, the engine is automatically restarted. By avoiding an unnecessary engine idling event, the vehicle's fuel economy is improved. For this purpose, it is desirable to shut down the engine function as much as possible when certain engine stop conditions are satisfied.

In a HEV equipped with an automatic transmission, a powertrain torque spike accompanies an engine startup process and occurs almost in phase with the engine speed increase. This peak powertrain torque disturbance is generated by the torque converter during the engine restart event and is transferred to the wheels if the engine is restarted in gear. This peak powertrain torque disturbance may produce as much as 0.26 g forward acceleration pulse in the vehicle producing an uncomfortable jerk.

Another torque disturbance that occurs during an engine restart in-gear is the gradient load torque $T_{RL}$, which is transmitted to the wheels by the driveline. $T_{RL}$=mg sin θ, wherein (m) is vehicle mass and (θ) is the road gradient angle.

In a passive brake-based wheel torque disturbance suppression control strategy, the brake master cylinder pressure threshold, which enables the engine shutdown action, must be increased in order to ensure the satisfaction of the passive brake pressure control operation. Unfortunately, fuel economy is jeopardized by the increased brake pressure threshold because less engine shutdown action is executed. Passive brake-based wheel torque disturbance suppression control performance is substantially affected by the operator's driving habits because hard braking is required to actuate the engine shutdown function. The consistency of the engine stop/start function, as well as the resulted fuel economy rating, will also change from driver-to-driver.

A need exists in the industry for a technique during an engine stop and restart event in a micro-HEV that suppresses the torque surge and keeps the vehicle in standstill when the engine is restarted during vehicle launch and during system triggered engine automatic startup.

SUMMARY OF THE INVENTION

A method for restarting an engine of a vehicle includes engaging a gear of a transmission that driveably connects the engine and wheels of the vehicle; maintaining a current brake pressure greater than a reference brake pressure; initiating an automatic engine restart; using a timer to count down during a period of predetermined length; using a pump to produce a desired magnitude of brake pressure sufficient to suppress a wheel torque surge produced by restarting the engine and to hold the vehicle stationary; and releasing the brake pressure if either the timer expires or a peak in engine speed occurs.

In order to solve the wheel torque disturbance suppression problem for the micro-HEV without sacrificing fuel economy and control consistency, an Active Brake Assisted Vehicle Start (ABAVS) control strategy has been developed.

Whenever, driver-actuated brake pressure is insufficient for wheel torque disturbance suppression, the control strategy activates the hydraulic brake valves and a pump motor to actively increase the brake line pressure up to a P_ABAVS pressure and hold the pressure at P_ABAVS thereafter. The service brake pump motor is started to drive the pump simultaneously as the engine cranks during restarting.

The pump noise is be masked by engine cranking noise, such that no chassis NVH problem occurs.

The automatic engine restart process is smooth and comfortable in comparison to a conventional vehicle having no engine stop and restart function. The control performance is consistent with the operator's driving expectations.

The ABAVS function assists vehicle startup in a driver triggered engine restart as the driver releases the brake and prepares for drive-off. It also helps keep the vehicle in stationary during a system triggered automatic engine restart event before the driver releases the brake pedal.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
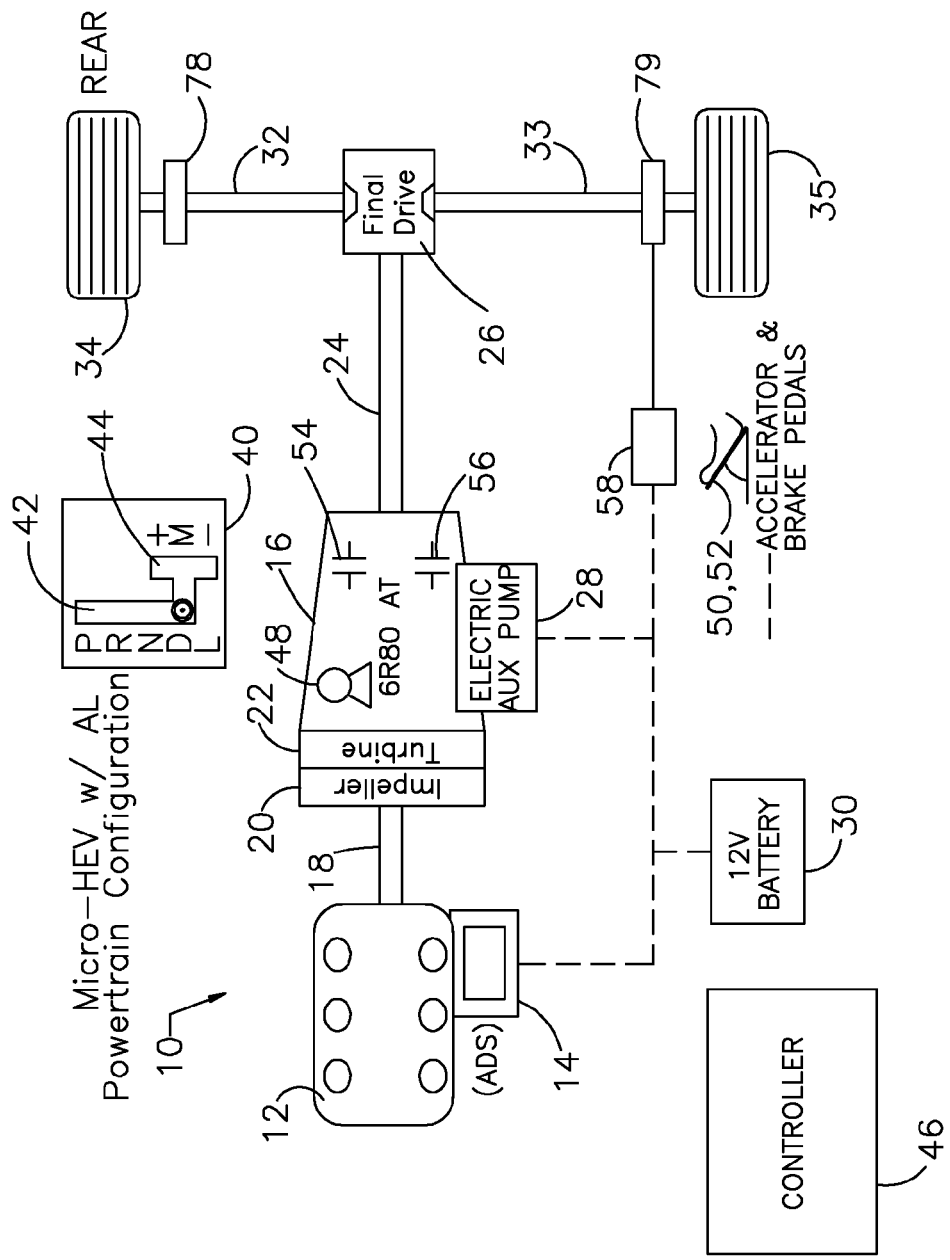
FIG. 1 is a schematic diagram of a micro-HEV powertrain.

Referring now to the drawings, the micro-HEV powertrain 10 of FIG. 1 includes a power source 12, such as an internal combustion engine; an enhanced engine starter motor 14;

automatic transmission 16; input shaft 18; impeller 20, driveably connected by shaft 18 to the engine; turbine 22, hydrokinetically driven by the impeller; transmission output 24; final drive mechanism 26, connected to the output; an electric auxiliary hydraulic pump (EAUX) 28, whose output pressurizes the hydraulic system of the transmission; an electric storage battery 30, which supplies electric power to the pump 28 and starter 14; and axle shafts 32, 33, driveably connect to the driven wheels 34, 35 through the output 24 and final drive mechanism 26.

A gear selector 40 is moved manually by the vehicle operator among P, R, N, D and L positions in an automatic mode channel 42 and between upshift (+) and downshift (−) positions in a manual mode channel 44.

Accelerator and brake pedals 50, 52, controlled manually by the vehicle operator, provide input demands to a controller 46 for changes in engine wheel torque and changes in brake force, respectively.

Located within transmission 16 are friction control elements, i.e., clutches and brakes, whose state of coordinated engagement and disengagement produce the forward gears and reverse gear. The first forward gear, low gear, is produced when at least one, but preferably two of the control elements 54, 56 are engaged concurrently. The transmission control elements, whose engagement produces the desired gear in which the vehicle will be launched, are referred to as launch elements 54, 56.

Hydraulic line pressure produced by the electric auxiliary pump 14 while the engine 12 is shutdown is used to fill and stroke the launch elements 54, 56, thereby preparing the transmission 16 for responsive torque transmission once the engine restart is completed. Stroking the launch control elements 54, 56 takes up clearances between the servo pistons and a pack of friction plates in the control elements, and clearances among the friction plates. The launch elements 54, 56 have substantially no torque transmitting capacity when stroke pressure is present in the servo cylinders that actuate the launch elements.

Transmission 16 also contains a hydraulic pump 53, such as a gerotor pump or vane pump, whose output is used to produce pressure in the transmission's hydraulic circuit, through which the control elements 54, 56 are pressurized to a state of full engagement in coordination with the engine restart method.

A service brake pump motor 58, driven by electric power from battery 30, produces and maintains pressure in wheel brakes 79, 79 during the engine restart event.

The microprocessor-based controller 46, accessible to Active Brake Assisted Vehicle Start (ABAVS) and engine restart control algorithm 70, communicates through electronic signals transmitted on a communication bus with the engine 12, starter 14, transmission 16, gear selector 40, battery 30, auxiliary pump 28, gear shifter 40, and the accelerator and brake pedals 50, 52.

Figure 2:
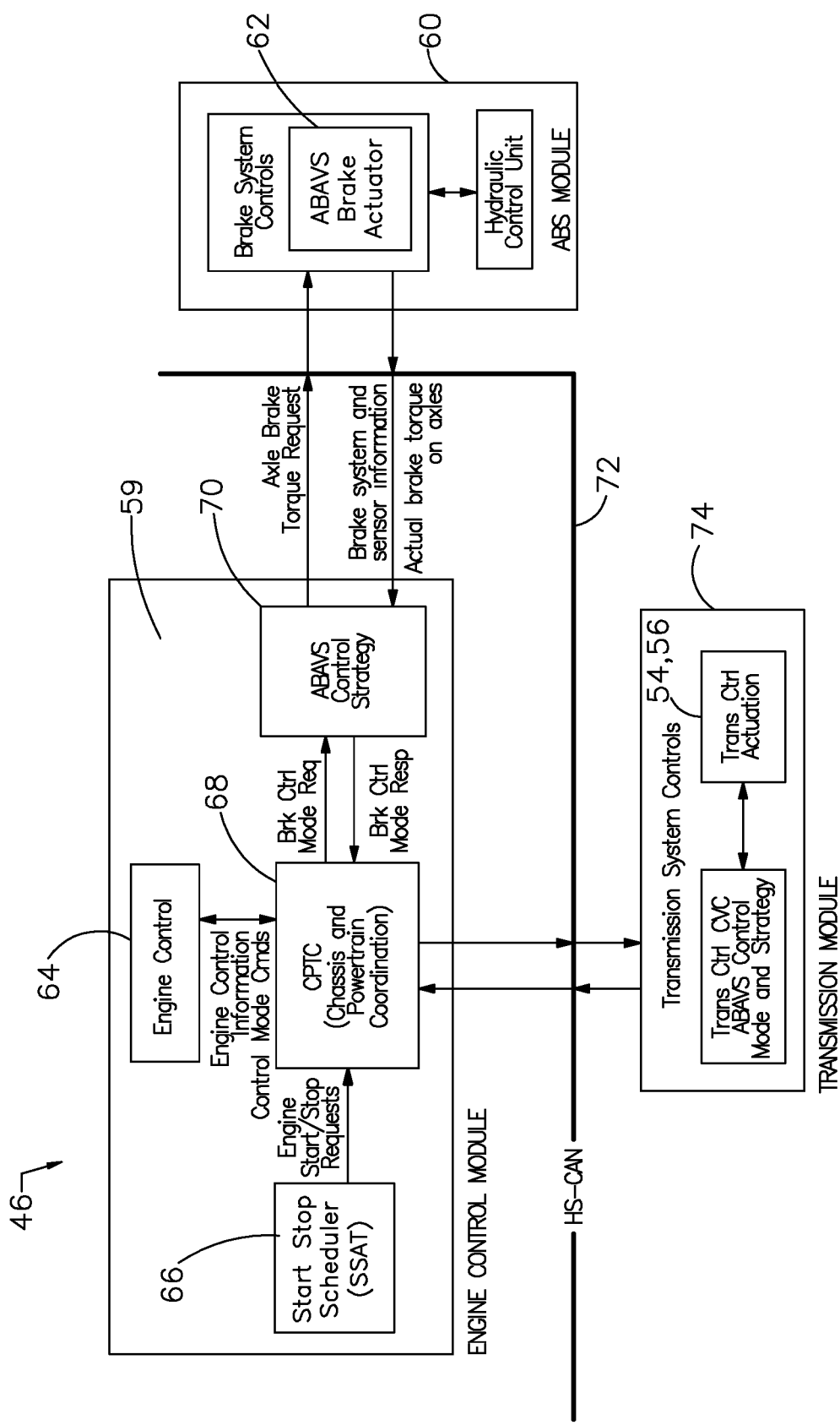
FIG. 2 is schematic diagram showing a portion of an ABAVS controller.

FIG. 2 schematically illustrates controller 46, which includes an engine control module 59, brake system control 60, and transmission control module 74. Controls 60 for the brake system, which include an ABAVS brake actuator 62, receive input signals from and transmit commands to brake actuators and sensors. The engine control module (ECM) 64 includes a start-stop scheduler (SSAT) 66, which transmits engine start/stop requests and requests to activate starter 14 to a chassis and powertrain coordinator (CPTC) 68, which contains an ABAVS engine restart control algorithm 70. The brake system controls 62 and CPTC 68 communicate through a high speed communications area network (HS-CAN) 72.

A transmission system controller 74, which communicates through bus 72 with the CPTC 68, transmits and receives signals representing transmission status and the transmission control mode. The servos that operate transmission control elements 54, 56 engage and disengage the control elements in response to these signals.

The control method use brakes 78, 79 to actively increase and maintain brake pressure on at least the driven wheels 34, 35 such that a powertrain torque disturbance that occurs during an engine restart event and the road gradient load torque are suppressed at the wheels.

When brake pressure due to the river's depressing brake pedal 52 is insufficient for wheel torque disturbance suppression, the ABAVS controller 46 actuates the service brake pump motor 58 and certain hydraulic valves to increase the brake line or wheel chamber pressure up to P_ABAVS level while the engine is cranked by starter 14. Thereafter, ABAVS controller 46 maintains brake system pressure at the P_ABAVS level until a peak in engine speed occurs.

For safety reasons, ABAVS controller 46 only functions for a predetermined time period during engine restart event. If the engine does not startup properly, ABAVS control is disabled after an ABAVS timer runs out. The ABAVS control is cancelled whenever the accelerator pedal travel is greater than a reference displacement or when brake pedal 52 is depressed.

During the restart event, the brake pressure is neither reduced too early, whereby a portion of the powertrain torque disturbance will be presented at the driven wheels, nor too late, whereby loss of degraded vehicle start performance results as the brake force opposes the vehicle from accelerating.

ABAVS controller 46 is enabled when the micro-HEV is stationary, brake pedal 52 is depressed, the magnitude of the road gradient is determined, engine 16 is stopped, accelerator pedal 50 is released, the park brake is released, and gear selector 40 is in Drive-range or Low-range positions.

Figure 3:
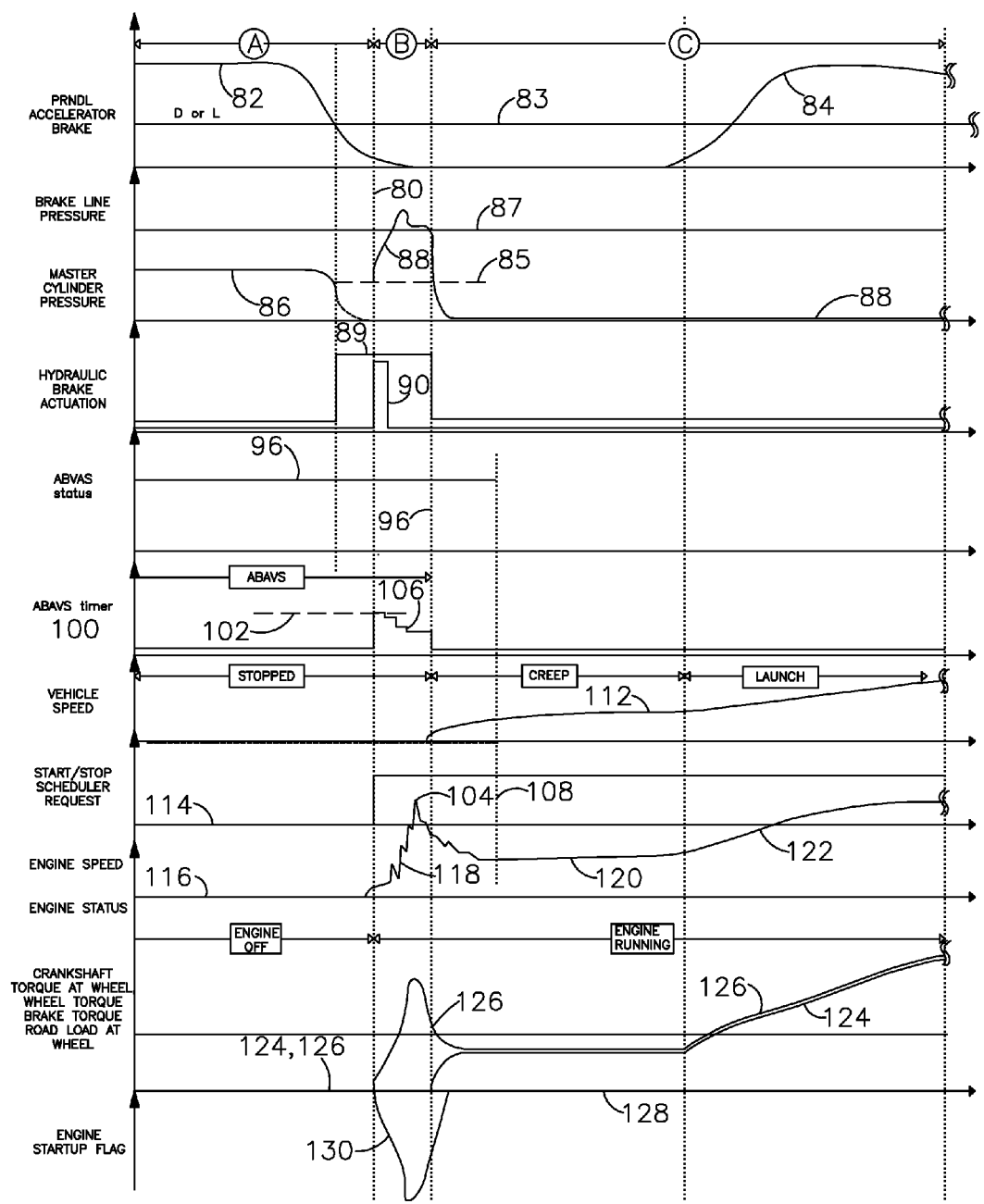
FIG. 3 contains graphs of powertrain variables during an engine restart under ABAVS control on a hill whose gradient is in a range between 3 percent and 7 percent.

Four use cases are illustrated in FIGS. 3-6 to demonstrate the function of the ABAVS engine restart control. FIG. 3 shows graphs of powertrain variables during an engine restart under ABAVS control on a hill whose gradient has a positive slope in a range between −3 percent and +3 percent. During period A, the vehicle is stopping and becomes stationary before the engine restart is initiated at 80 by a restart request. During period B, an engine restart is initiated and combustion becomes sustained. During period C, the vehicle creeps ahead and launches as vehicle speed on the uphill slope increases.

Graph 82 represents the application and subsequent gradual release of the brake pedal 52 while the vehicle is stopped.

Graph 83 indicates that the gear selector 40 is continually in the Drive or Low positions. While the vehicle is stopped, the magnitude of the road gradient is identified, driver applies brake pedal 52 to keep the vehicle stationary, and ABAVS control is enabled.

Graph 84 represents the application of the accelerator pedal 50 following the engine restart.

The road gradient torque load $T_{RL}$, which is transmitted from the wheels 34, 35 though the driveline to the transmission 16, is $T_{RL}=mg \sin \theta$, wherein (m) is vehicle mass and $\theta$ is the road gradient angle.

When the driver depresses brake pedal 52 to decelerate the vehicle, brake pressure 86 in brakes 78, 79 is less than P_ABAVS 87. When the driver releases the brake pedal 52 and prepares to accelerate the vehicle, brake pressure 88 in brakes 78, 79 is held constant, then increases greater than P_ABAVS 87 when the engine restart begins at 80, and decreases to zero pressure after the engine speed peaks at 104.

Graph 89 represents the activated and deactivated state of brake circuit priming valves. Due to insufficient brake line pressure to suppress the powertrain torque spike at engine restart, the hydraulic pump motor 58 is activated to run for a short period concurrently with engine cranking to increase brake line pressure 88 to P_ABAVS 87. Graph 90 represents the activated and deactivated state of hydraulic pump motor 58.

Graph 94 shows that ABAVS control is enabled after the engine 12 stops and gear selector 40 is in the D or L position, and inactive after the engine starts or a ABAVS timer 100 expires at 102. Graph 96 represents active ABAVS control after release of the brake pedal 52.

The engine restart is initiated at 80 by using starter 14 to crank engine 12 as brake pedal 50 is released while the gear selector 40 is in a forward drive position, i.e., the DRIVE or LOW position.

Controller 46 sets an engine starting flag when the engine restart is initiated at 80, an engine speed peak passed flag, and an engine running flag when sustained engine combustion occurs.

ABAVS timer 100 is set to a calibrated level 102 and begins to count down 106 when the engine restart is initiated at 80. If the calibrated level 102 of ABAVS timer 100 expires before the engine starts at 108, brake pressure 88 is reduced immediately. When the engine starts at 106, brake pressure 88 is reduced immediately regardless of whether timer 100 has expired.

Graph 112 represents vehicle speed increasing from zero after sustained engine combustion occurs at 108.

Graph 114 represents the state of the engine restart request, which occurs at 80.

Graph 116, which represents engine speed, shows an increase in engine speed beginning at initiation of the engine restart 80 when the starter 14 cranks the engine 12. Engine speed continues to increase following the first engine combustion 118, remains relatively steady at idle speed 120 during the period while engine combustion is sustained, and increases further 122 as engine torque increases.

Graph 124 represents wheel torque $T_{WHL}$, which is the sum of engine crankshaft torque at the wheels 34, 35 in the current gear $T_{CRANK\_WHL}$; wheel brake torque $T_{BRK}$; and road load at the wheels $T_{RL}$ ($T_{WHL}=T_{CRANK\_WHL}+T_{BRK}+T_{RL}$). Graph 126 represents crankshaft torque $T_{CRANK\_WHL}$ at the wheels 34, 35 in the current gear. Graph 128 represents road gradient torque load at the wheels $T_{RL}$ which remains substantially zero. Graph 130 represents brake torque at the wheels. A delay 132 of about 300-500 ms occurs in delivering wheel creep torque following restart initiation, depending on how quickly the engine 12 can be restarted.

Figure 4:
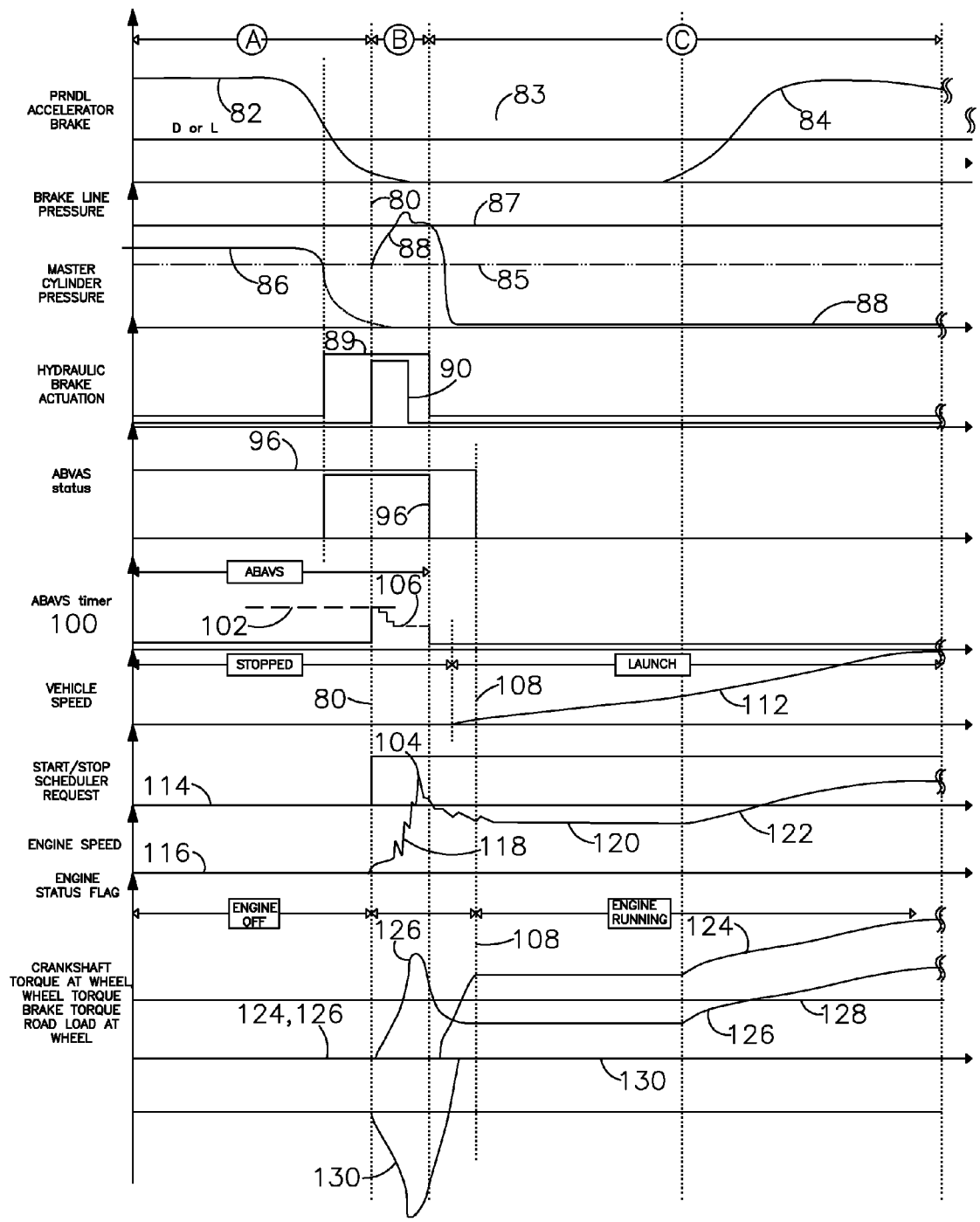
FIG. 4 contains graphs of powertrain variables during an engine restart under ABAVS control on a hill whose gradient is in a range between 7 percent and 35 percent.

Similar to first use case of FIG. 3, the second ABAVS use case, shown in FIG. 4, illustrates the ABAVS control function when the engine is stopped automatically, the vehicle is stationary on a hill with a negative slope in a range equal to or less than three percent, and the brake pressure caused by the driver's depressing brake pedal 52 is sufficient to hold the vehicle on the hill but is insufficient to suppress both the powertrain disturbance torque and the road gradient torque load concurrently.

When the driver depresses brake pedal 52 to decelerate the vehicle, brake pressure 86 in brakes 78, 79 is greater than hill hold pressure 85 but less than P_ABAVS 87 that would hold the vehicle on the hill and suppress the powertrain disturbance torque. When the driver releases the brake pedal 52 and prepares to accelerate the vehicle, the brake pressure 88 in brakes 78, 79 is held constant, the hydraulic pump motor 58 is activated to run for a short period concurrently with engine cranking to increase brake line pressure 88 to P_ABAVS 87. The ABAVS control then increases greater than P_ABAVS 87 when the engine restart begins at 80 and decreases brake system pressure P_ABAVS 87 to zero pressure after the engine speed peaks at 104.

Figure 5:
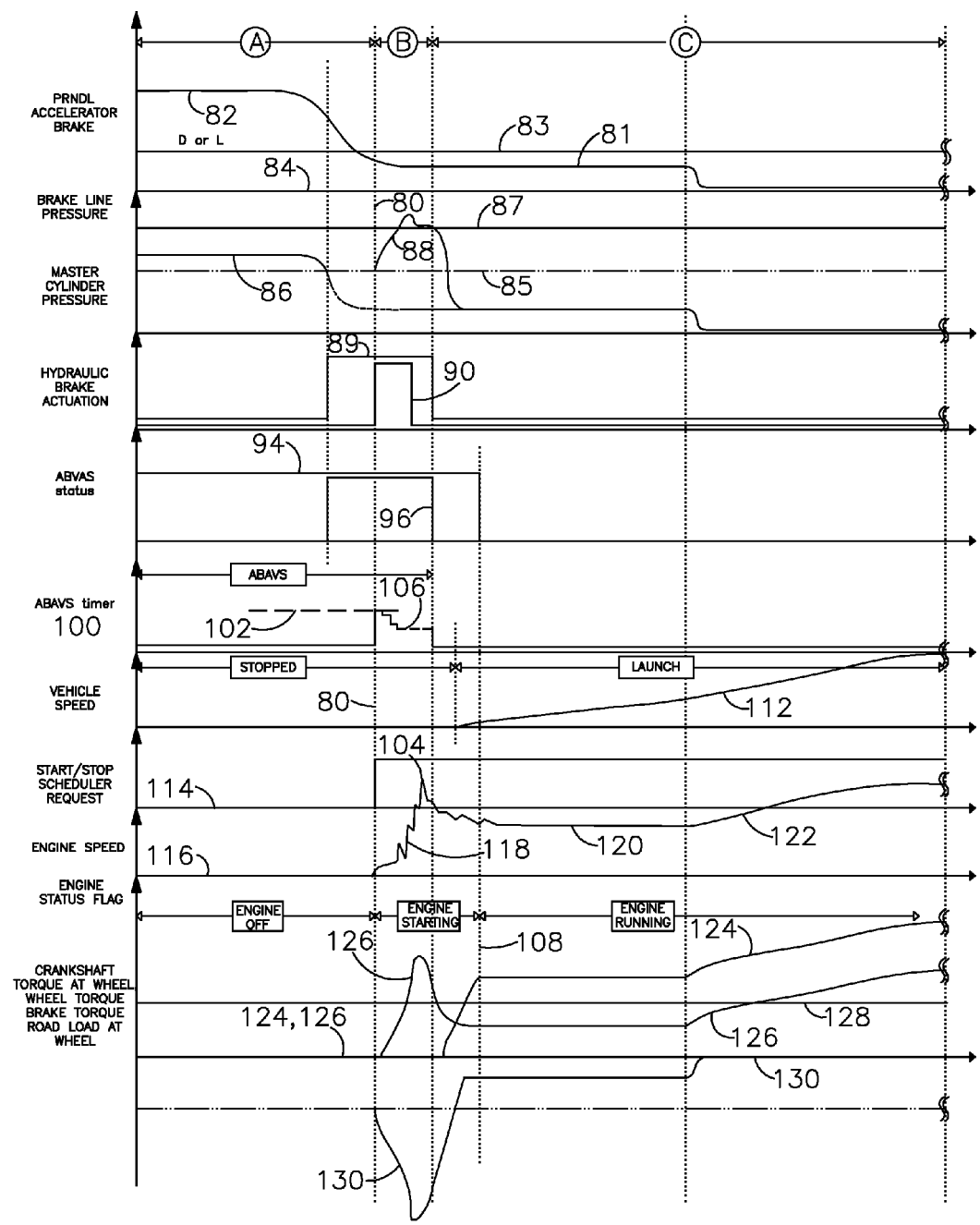
FIG. 5 contains graphs of powertrain variables during an engine restart under an alternative ABAVS control to that of FIG. 4.

Similar to the second use case, the third use case, shown in FIG. 5, illustrates the ABAVS control function when the engine is stopped automatically, the vehicle is stationary on a hill with a negative slope in a range equal to or less than three percent, and brake pedal 52 is partially released at 81 by the driver. The brake pressure caused by the driver's depressing brake pedal 52 is sufficient to hold the vehicle on the hill, but it is insufficient to suppress both the powertrain disturbance torque and the road gradient torque load concurrently. The ABAVS brake pressure is released when the powertrain torque generated at wheels 34, 35 is sufficient to counteract the vehicle gradient load.

Figure 6:
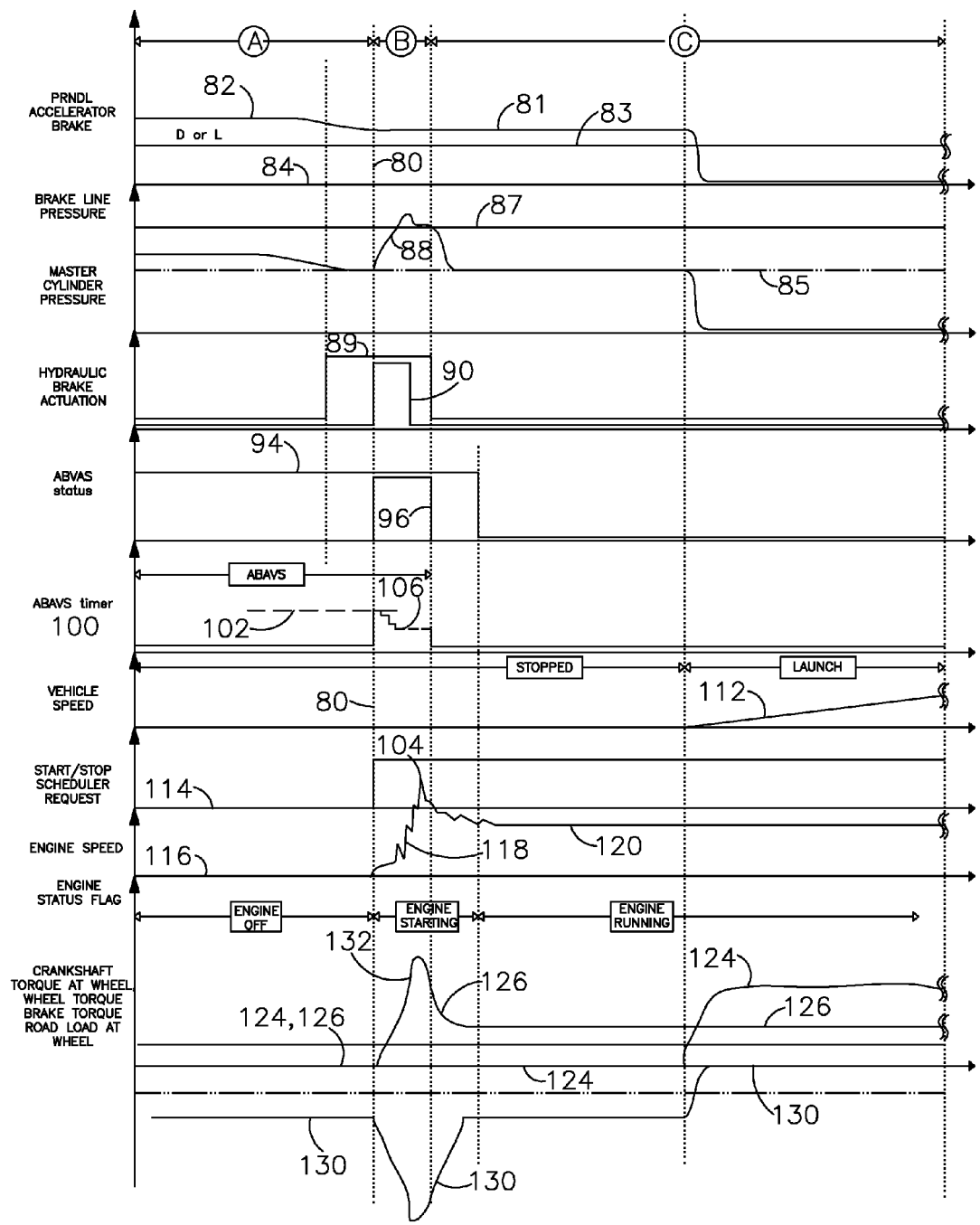
FIG. 6 contains graphs of powertrain variables during an engine restart under ABAVS control on a downhill.

In FIG. 6, a system triggered automatic engine startup event is illustrated to show how ABAVS actively builds up brake pressure 88 and wheel brake torque 130 while the driver maintains brake pedal 52 partially depressed at 81. After the spike 132 in powertrain torque 126 is passed, the ABABS brake line pressure is released and decreases to the driver's current input level. The control process is silent to the driver.

Figure 7A:
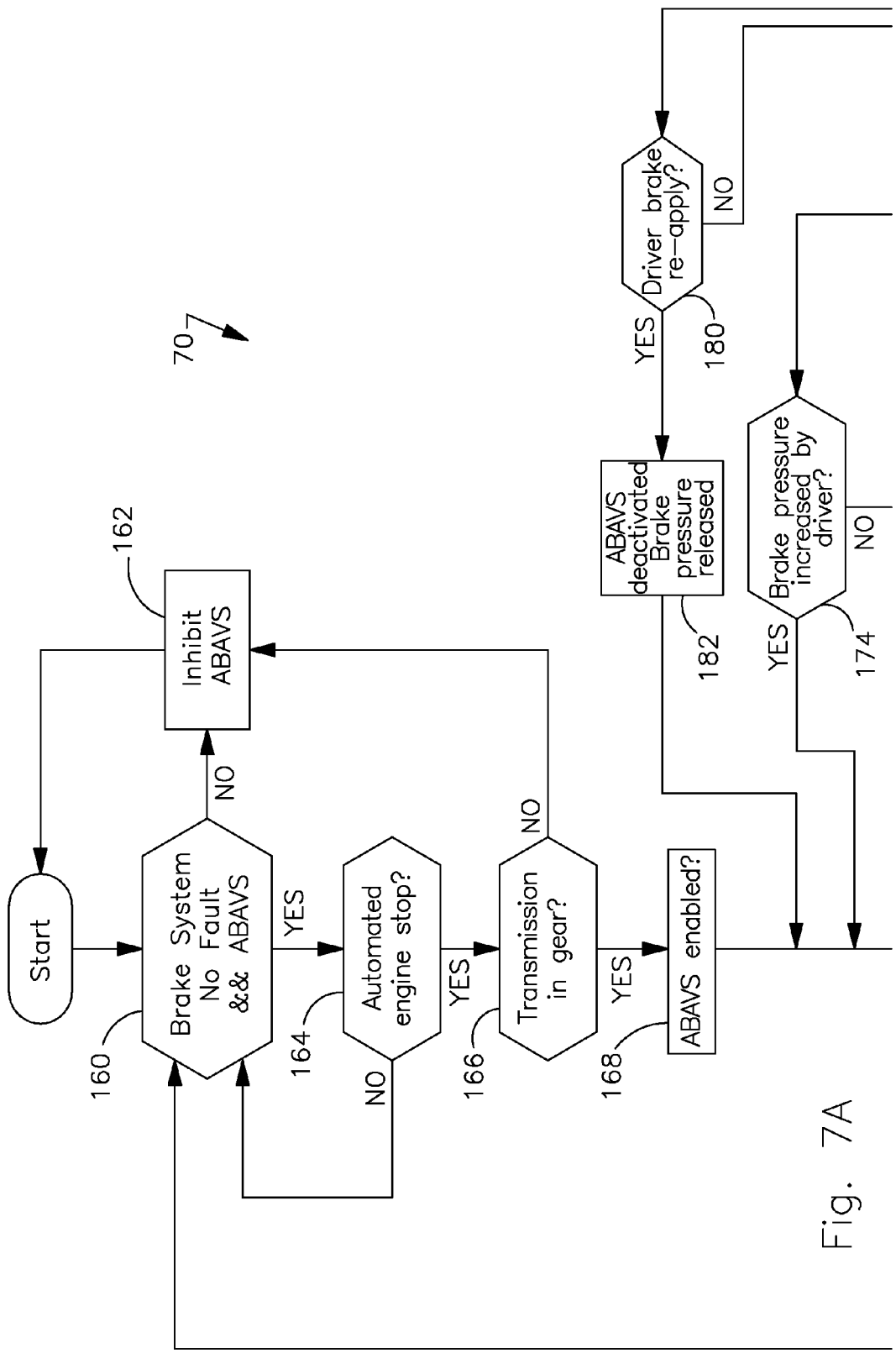
FIGS. 7A-7C illustrate a logic flow diagram of the steps of an algorithm for controlling the engine restart.
Figure 7B:
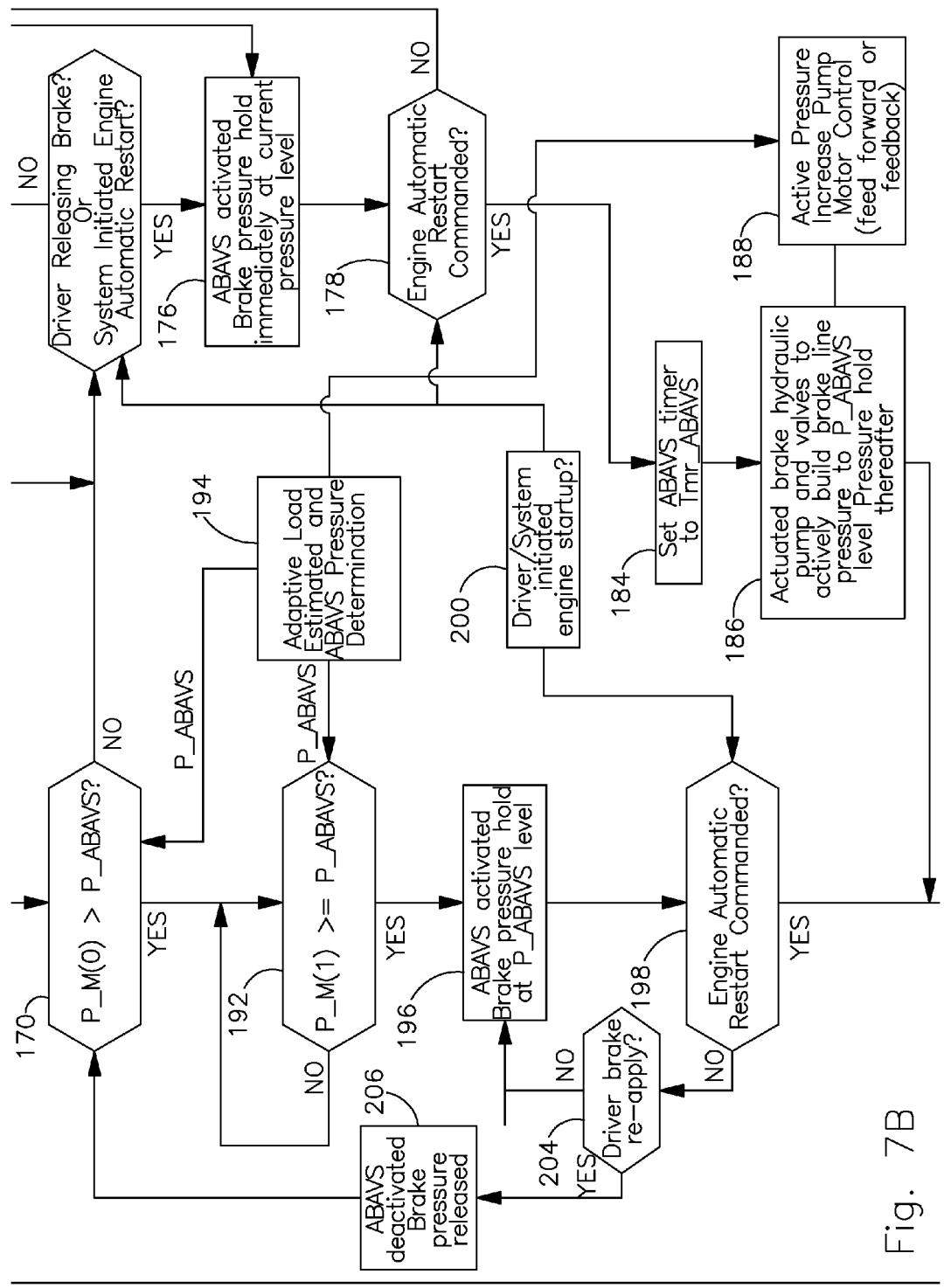
Figure 7C:
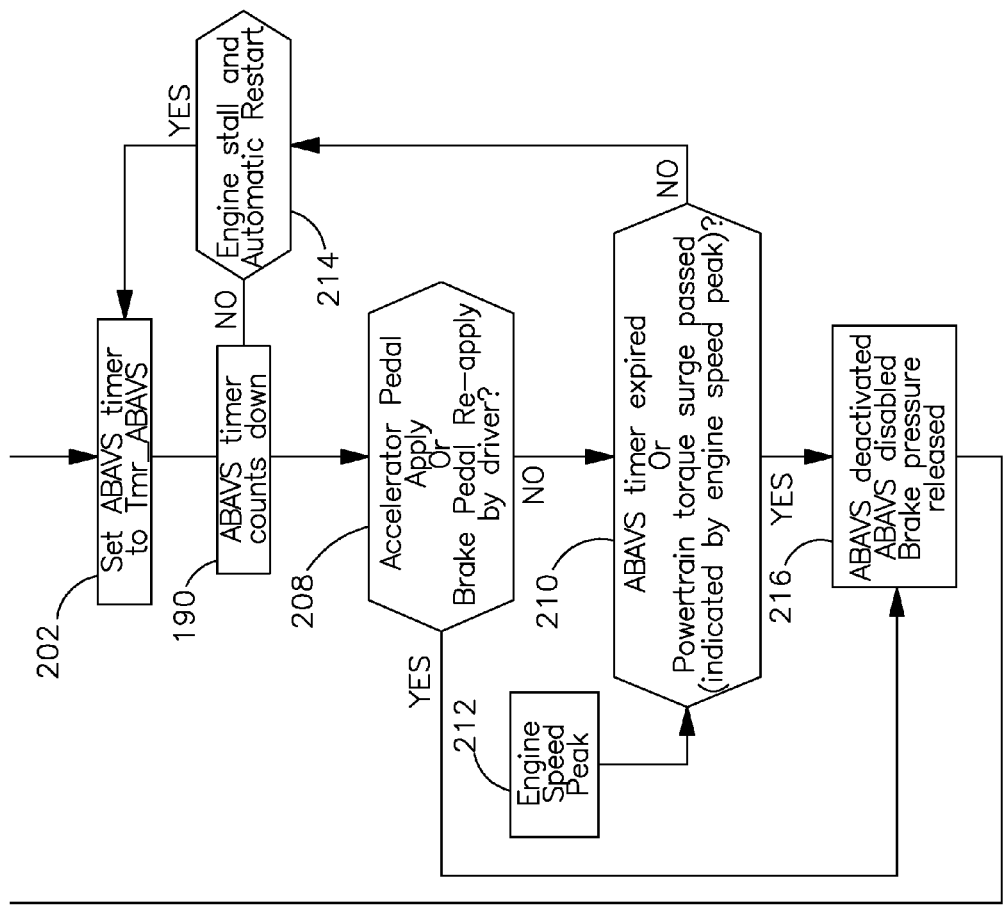

FIGS. 7A-7C illustrate a logic flow diagram of the steps of algorithm 70 for controlling the engine restart event. At step 160 a test is made to determine whether the brake system is operative. If the result of test 160 is logically false, at step 162 the ABAVS control is inhibited, i.e., turned off, and control return to step 160.

If the result of test 160 is logically true, at step 164 a test is made to determine whether an automated engine stop has occurred. If the result of test 164 is logically false, control returns to step 160.

If the result of test 164 is true, at step 166 a test is made to whether transmission 16 is in gear. If the result of test 166 is false, control returns to step 162.

If the result of test 166 is true, ABAVS control is in enabled at step 168.

At step 170 a test is made to whether the master cylinder pressure at the instant the engine restart is initiated is greater than the pressure required to hold the vehicle on a hill and to suppress the powertrain torque surge caused by restarting the engine, i.e., P_ABAVS.

If the result of test 170 is false, at step 172 a test is made to whether the brake pedal 52 is released or an engine restart has been initiated. If the result of test 172 is false, at step 174 a test is made to whether the brake pressure has been increased by depressing brake pedal 52. If the result of test 174 is false, control returns to step 172. If the result of test 174 is true, control returns to step 170.

If the result of test 172 is true, at step 176 brake pressure is maintained at its current magnitude.

At step 178, a test is made to determine whether an automatic engine restart is commanded at step 200. If the result of test 178 is false, at step 180 a test is made to determine whether brake pedal 52 has been reapplied. If the result of test 180 is false, control then returns to step 176.

If the result of test 180 is true, at step 182, brake pressure is released and control returns to step 170.

If the result of test 178 is true, at step 184 ABAVS timer 100 is set to a calibrated period length.

At step 186 the brake hydraulic pump 58 is activated to increase brake pressure to the P_ABAVS magnitude using either feed forward or feedback control at step 188. Thereafter, control advances to step 190, where timer 100 counts down.

If the control is a feed forward control, a calibratable lookup table can be generated to relate the duration of brake pump motor 58 operation and pressure difference between P_hold_ini (the initial pressure hold level when ABAVS control is activated) and P_ABAVS. When feed forward control is used, the brake pump motor 58 is activated for a certain length of time in open loop control mode to compensate the pressure difference between P_hold_ini and P_ABAVS.

If the control is a feedback control, the brake line/wheel chamber pressure is controlled in closed-loop to track the reference P_ABAVS pressure level.

As a result of either feed forward or feedback control, the brake pressure will be kept at the P_ABAVS level at the instant the powertrain torque spike occurs. Such a torque disturbance at wheels 34, 35 will be suppressed by the reaction friction torque from the wheel brake and no vehicle UVA/UVM will be perceived. The brake pressure is released immediately after the powertrain torque spike occurs, in order to prepare for vehicle creeping and vehicle drive-off or to return to the driver's brake pressure input level.

If the result of test 170 is true, at step 192 a test is made to determine whether the current master cylinder pressure is less than or equal to the pressure required to hold the vehicle on a hill and to suppress the powertrain torque surge, i.e., P_ABAVS, as determine at step 194.

If the result of test 192 is false, control returns to step 192. If the result of test 192 is true, at step 196 ABAVS control is activated and brake pressure is held at the current P_ABAVS magnitude to keep the vehicle stationary.

At step 198 a test is made to determine whether an engine restart command has issued from controller 46 at step 200.

If the result of test 198 is true, at step 202 ABAVS timer 100 is set to a calibrated period length, and at step 190, timer 100 counts down.

If the result of test 198 is false, at step 204 a test is made to determine whether the driver has reapplied brake pedal 52. If the result to test 204 is false, control returns to step 196. If the result of test 204 is true, at step 206 ABAVS control is deactivated, brake pressure P_ABAVS is released, and control returns to step 170.

At step 208 a test is made to determine whether the accelerator pedal 50 has been depressed or the brake pedal 52 has been reapplied.

If the result of test 208 is false, at step 210 a test is made to determine whether timer 100 has expired or whether the powertrain torque surge has occurred, as indicated at step 212 by the occurrence of the peak 104 in engine speed, or an engine speed threshold has passed and engine startup speed peak has been detected, or an engine speed threshold has passed for a certain calibration time duration and a level of calibrated engine speed gradient occurs, or the powertrain wheel torque is larger than the road gradient load torque if the road gradient angle is larger than a threshold in uphill vehicle launch, or reapplication of the brake pedal is detected.

If the result of test 208 is false, at step 210 a test is made to determine whether timer 100 has expired or whether the powertrain torque surge has occurred, as indicated at step 212 by the occurrence of the peak 104 in engine speed.

If the result of test 210 is false, i.e., either timer 100 is unexpired or the engine speed peak has occurred, at step 214 a test is made to determine engine 12 has stalled and been restarted automatically. If the result of test 214 is false, control returns to step 190. If the result of test 214 is true, control returns to step 202.

If the result of test 210 is true or the result of test 208 is true, at step 216 ABAVS control is deactivated and disabled, brake pressure is released, and control returns to step 160.

The ABAVS brake pressure hold function is terminated immediately in the presence of accelerator pedal apply or brake pedal re-apply. Here, the brake pedal re-apply is defined as the increase of brake line pressure by the driver up to the ABAVS pressure hold level.

The ABAVS control includes the case where individual brake circuit pressure or wheel chamber pressure is used for control action determination rather than brake master cylinder pressure.

In accordance with the provisions of the patent statutes, the preferred embodiment has been described. However, it should be noted that the alternate embodiments can be practiced otherwise than as specifically illustrated and described.

The invention claimed is:

1. A method for restarting an engine of a vehicle, comprising the steps of:
    (a) engaging a gear of a transmission that driveably connects the engine and wheels of the vehicle;
    (b) maintaining a current brake pressure greater than a reference brake pressure;
    (c) initiating an automatic engine restart;
    (d) using a timer to count down during a period of predetermined length;
    (e) using a pump to produce a desired magnitude of brake pressure sufficient to suppress a wheel torque surge produced by restarting the engine and to hold the vehicle stationary;
    (f) releasing the brake pressure.

2. The method of claim 1 further comprising using the engine to accelerate the vehicle.

3. The method of claim 1 wherein step (a) further comprises engaging a forward drive gear.

4. The method of claim 1 wherein step (a) further comprises releasing a brake pedal.

5. The method of claim 1 wherein step (e) further comprises:
    holding the vehicle stationary in opposition to a road gradient; and
    determining the road gradient wheel torque using the relationship $T_{RL} = mg \sin \theta$, wherein $T_{RL}$ is the gradient wheel torque, (m) is vehicle mass and $\theta$ is the angle of the road gradient with respect to a horizontal plane.

6. The method of claim 1 wherein step (c) further comprises using a starter motor to crank the engine during the engine restart.

7. The method of claim 1 wherein step (e) further comprises:
    using a feed forward control in which a calibratable lookup table relates the duration of brake pump motor operation and a pressure difference between an brake pressure when ABAVS control is activated and P_ABAVS; and
    activating the brake pump motor for a period in open loop control mode to increase brake pressure to the desired magnitude of brake pressure.

8. The method of claim 1 wherein step (e) further comprises:
    using a closed loop feed back control to increase brake pressure to the desired magnitude of brake pressure.

9. A method for restarting an engine of a vehicle, comprising the steps of:
    (a) engaging a gear of a transmission that driveably connects the engine and wheels of the vehicle;
    (b) if a current brake pressure is less than a reference brake pressure, using a pump to produce a desired magnitude of brake pressure sufficient to suppress a wheel torque surge due to restarting the engine and to hold the vehicle stationary;

(c) maintaining brake pressure equal to or greater than the desired brake pressure;

(d) initiating an automatic engine restart;

(e) using a timer to count down during a period of predetermined length; and (f) releasing the brake pressure.

10. The method of claim 9 further comprising using the engine to accelerate the vehicle.

11. The method of claim 9 wherein step (a) further comprises engaging a forward drive gear.

12. The method of claim 9 wherein step (a) further comprises releasing a brake pedal.

13. The method of claim 9 wherein step (b) further comprises:

holding the vehicle stationary in opposition to a road gradient; and determining the road gradient wheel torque using the relationship $TRL=mg \sin \theta$, wherein $T_{RL}$ is the gradient wheel torque, (m) is vehicle mass and $\theta$ is the angle of the road gradient with respect to a horizontal plane.

14. The method of claim 9 wherein step (c) further comprises using a starter motor to crank the engine during the engine restart.

15. A system for automatically restarting an engine of a vehicle, comprising:

wheels for propelling the vehicle;

wheel brakes for alternately holding and releasing rotation of the wheels;

a brake system for pressurizing the wheel brakes;

an engine;

a transmission engaged in a gear through which the engine is driveably connected to the wheels; and a controller configured to maintain a current brake pressure greater than a reference brake pressure, initiate an automatically engine restart, set a timer to count down during a period of predetermined length, activate a pump to produce a desired magnitude of brake pressure sufficient to suppress a wheel torque surge produced by restarting the engine and to hold the vehicle stationary, and release the brake pressure.

16. The system of claim 15 wherein the controller is further configured to use the engine to accelerate the vehicle.

17. The system of claim 15 wherein the controller is further configured to determine the road gradient wheel torque using the relationship $T_{RL}=mg \sin \theta$, wherein $T_{RL}$ is the gradient wheel torque, (m) is vehicle mass and $\theta$ is the angle of the road gradient with respect to a horizontal plane.

18. A system for automatically restarting an engine of a vehicle, comprising:

wheels for propelling the vehicle;

wheel brakes for alternately holding and releasing rotation of the wheels;

a brake system for pressurizing the wheel brakes;

an engine;

a transmission engaged in a gear through which the engine is driveably connected to the wheels; and a controller configured to activate a pump to produce a desired magnitude of brake pressure sufficient to suppress a wheel torque surge due to restarting the engine and to hold the vehicle stationary if a current brake pressure is less than a reference brake pressure, maintain brake pressure equal to or greater than the desired brake pressure, initiating an automatic engine restart, set a timer to count down during a period of predetermined length, and release the brake pressure.

19. The system of claim 18 wherein the controller is further configured to use the engine to accelerate the vehicle.

20. The system of claim 18 wherein the controller is further configured to determine the road gradient wheel torque using the relationship $T_{RL}=mg \sin \theta$, wherein $T_{RL}$ is the gradient wheel torque, (m) is vehicle mass and $\theta$ is the angle of the road gradient with respect to a horizontal plane.

* * * * *